US009720723B2

(12) United States Patent
Bacher et al.

(10) Patent No.: US 9,720,723 B2
(45) Date of Patent: *Aug. 1, 2017

(54) PROTECTED GUESTS IN A HYPERVISOR CONTROLLED SYSTEM

(71) Applicant: International Business Machines Corporation, Armonk, NY (US)

(72) Inventors: Utz Bacher, Dettenhausen (DE); Reinhard T. Buendgen, Tuebingen (DE); Heiko Carstens, Boeblingen (DE); Dominik Dingel, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/919,791

(22) Filed: Oct. 22, 2015

(65) Prior Publication Data

US 2017/0004001 A1    Jan. 5, 2017

Related U.S. Application Data

(63) Continuation of application No. 14/788,992, filed on Jul. 1, 2015.

(51) Int. Cl.
| | | |
|---|---|---|
| G06F 12/06 | (2006.01) | |
| G06F 9/455 | (2006.01) | |
| G06F 12/14 | (2006.01) | |

(52) U.S. Cl.
CPC ........ G06F 9/45558 (2013.01); G06F 12/145 (2013.01); G06F 2009/4557 (2013.01);
(Continued)

(58) Field of Classification Search
CPC ........................... G06F 12/145; G06F 9/45558
(Continued)

(56) References Cited

U.S. PATENT DOCUMENTS 8,555,081 B2 * 10/2013 Chen ..................... G06F 9/4426
 713/189
8,909,898 B2 * 12/2014 Durham ................ G06F 12/145
 711/202

(Continued)

FOREIGN PATENT DOCUMENTS

WO      2013097903 A1     7/2013
WO  WO 2015026925 A1 *  2/2015   ....... G06F 17/30076

OTHER PUBLICATIONS

Boivie, Rick, "SecureBlue++: CPU Support for Secure Execution", IBM Research Report, RC25287 (WAT1205-070) May 23, 2102, pp. 1-9.

(Continued)

*Primary Examiner* — Pierre-Michel Bataille
(74) *Attorney, Agent, or Firm* — William H. Hartwell (57) ABSTRACT

A computer-implemented method includes receiving a definition of a source guest memory area for utilization by a virtual machine on a source system, wherein the source system includes a source trusted firmware and a source hypervisor. The method restricts write access to the source guest memory area of the virtual machine. The method receives repeatedly a source guest memory page location, content for each of a plurality of source guest memory pages, and an integrity value for each of a plurality of source guest memory page locations. The method receives a global integrity value for integrity values associated with the plurality of source guest memory page locations, wherein a latest integrity values for each of the plurality of source guest memory page locations is utilized. Subsequent to verifying the global integrity value, the method initializes the virtual machine on the source hypervisor.

14 Claims, 5 Drawing Sheets

(52) U.S. Cl.
CPC .............. *G06F 2009/45562* (2013.01); *G06F 2009/45583* (2013.01); *G06F 2009/45587* (2013.01); *G06F 2212/1052* (2013.01); *G06F 2212/151* (2013.01)

(58) Field of Classification Search
USPC .................................................. 711/163, 156
See application file for complete search history.

(56) References Cited

U.S. PATENT DOCUMENTS

| | | | | |
|---|---|---|---|---|
| 2003/0074567 | A1* | 4/2003 | Charbonneau | G06F 21/565 713/186 |
| 2007/0192577 | A1* | 8/2007 | Kozuch | G06F 21/57 713/1 |
| 2008/0201540 | A1 | 8/2008 | Sahita et al. | |
| 2008/0256321 | A1 | 10/2008 | Armstrong et al. | |
| 2009/0063750 | A1* | 3/2009 | Dow | G06F 12/08 711/6 |
| 2012/0255018 | A1* | 10/2012 | Sallam | G06F 12/14 726/24 |
| 2012/0291094 | A9 | 11/2012 | Forrester et al. | |

OTHER PUBLICATIONS

Szefer et al., "Architectural Support for Hypervisor-Secure Virtualization", ASPLOS'12, Mar. 3-7, 2012, London, England, Copyright © 2012, ACM; pp. 437-449.

"Software Guard Extensions Programming Reference", Intel, 329298-001US, Sep. 2013, Copyright © 2010-2013, Intel Corporation, pp. 1-156, <http://web.archive.org/web/20150302011836/https://software.intel.com/sites/default/files/329298-001.pdf>.

U.S. Appl. No. 14/788,992, Entitled "Protected Guests in a Hypervisor Controlled System", filed Jul. 1, 2015.

Appendix P.: List of IBM Patents or Patent Applications Treated as Related, Dated Oct. 22, 2015, 2 pages.

* cited by examiner

PROTECTED GUESTS IN A HYPERVISOR CONTROLLED SYSTEM

BACKGROUND

The present invention relates generally to virtual machines and more particularly to establishing a protected virtual machine in a hypervisor controlled system.

A lifecycle of a virtual machine, also known as a guest, can vary depending on specific operations the virtual machine is assigned to perform. Prior to virtual machines, physical servers used to perform dedicated tasks without having the ability to shuffle tasks between other physical servers for efficiency purposes. Typically, a virtual machine is prepared for tasks with the same operating system (OS), applications, and configurations and stored in a physical storage until the virtual machine can execute the task. Once the task is sent to a physical server supporting the virtual machine, the physical server can perform the task assigned to the virtual machine, the physical server can shut down upon completion, and revert back to the physical storage. As a result, virtual machines are utilized like physical servers but with a distribution of tasks to decrease operation frequency. Typically, a service provider manages virtual machines, where a client utilizing the virtual machines has to trust that the integrity of the virtual machines has not been compromised.

SUMMARY

Embodiments of the present invention include a method, computer program product and computer system for initializing a virtual machine on a hypervisor. A computer-implemented method includes: receiving a definition of a source guest memory area for utilization by a virtual machine on a source system, wherein the source system includes a source trusted firmware and a source hypervisor; restricting write access to the source guest memory area of the virtual machine; receiving repeatedly a source guest memory page location, content for each of a plurality of source guest memory pages, and an integrity value for each of a plurality of source guest memory page locations; receiving, a global integrity value for integrity values associated with the plurality of source guest memory page locations, wherein a latest integrity values for each of the plurality of source guest memory page locations is utilized; and subsequent to verifying the global integrity value received from the source hypervisor matches the integrity values, initializing, by one or more processors, the virtual machine on the source hypervisor.

DETAILED DESCRIPTION

A virtual machine operates under a hypervisor, where the hypervisor incrementally establishes guest memory pages in a guest memory area for a virtual machine (i.e., guest) to perform tasks. The hypervisor manages guest memory page in and out on a single system, as well as, transferring of guest memory pages during a virtual machine migration from a source system to a target system. Embodiments in accordance with the present invention ensure that the hypervisor does not corrupt the guest memory pages for the virtual machine, whether it be during guest memory page in and out operations or during guest memory page migration between the source system and target system.

Figure 1:
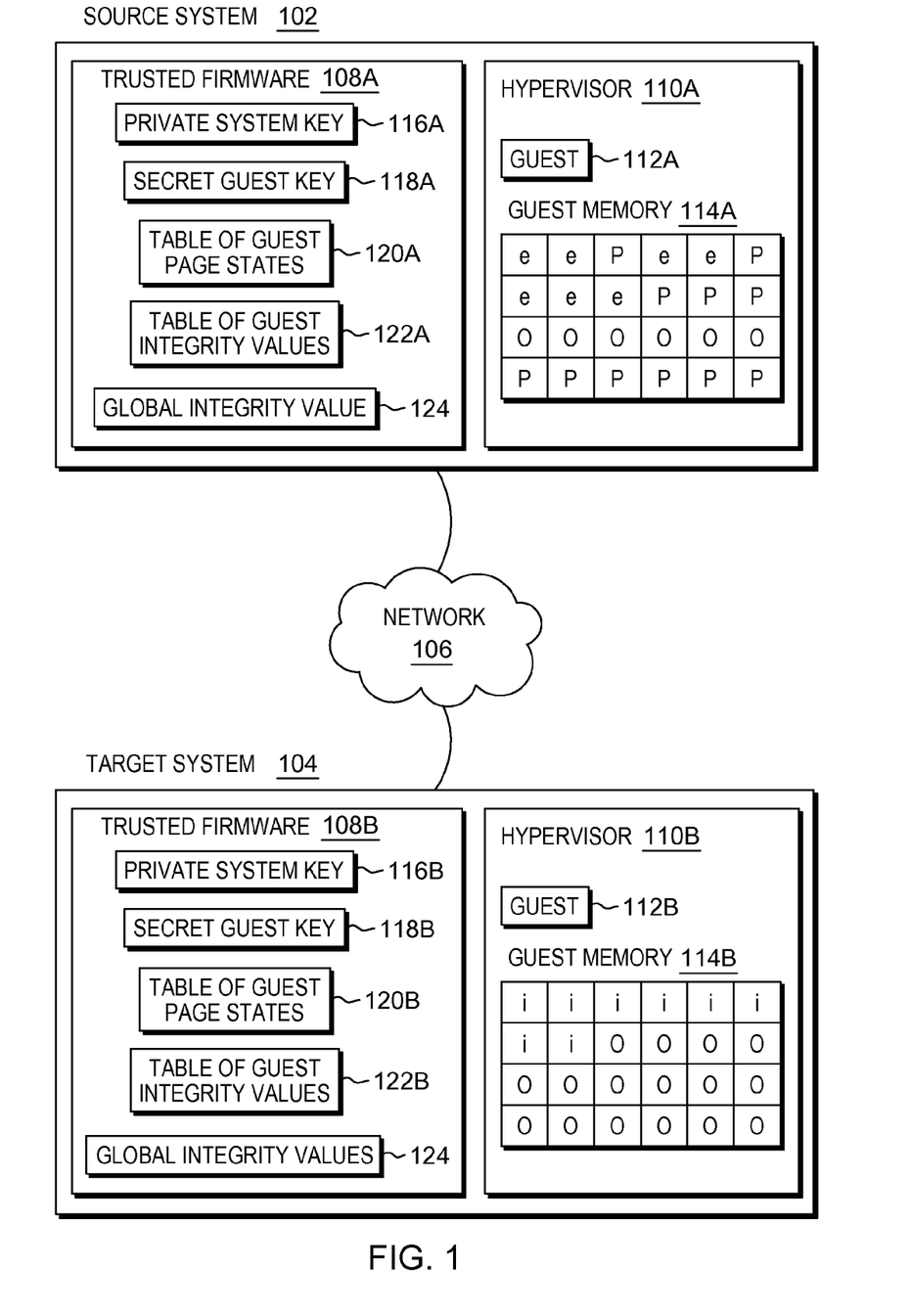
FIG. 1 is a functional block diagram illustrating a distributed data processing environment, in accordance with an embodiment of the present invention.

Example embodiments in accordance with the present invention will now be described in detail with reference to the drawing figures. FIG. 1 is a functional block diagram illustrating a distributed data processing environment, in accordance with one embodiment of the present invention. The distributed data processing environment includes source system 102 and target system 104, interconnected over network 106.

Source system 102 and target system 104 each represent a computer system utilizing clustered computers and components that act as a single pool of seamless resources when accessed through an I/O network (not illustrated in FIG. 1), as is common in data centers and with cloud computing applications. In general, source system 102 and target system 104 are representative of any programmable electronic device or combination of programmable electronic devices capable of executing machine-readable program instructions and communicating with other computer devices via a network. Source system 102 and target system 104 support hypervisor 110A and 110B through trusted firmware 108A and 108B, respectively. In this embodiment, support for a virtual machine (i.e., guest) is being transferred from source system 102 to target system 104.

Source system 102 includes trusted firmware 108A and target system 104 includes trusted firmware 108B. Firmware 108A and 108B include table of guest page states 120A and 120B, respectively. Table of guest page states 120A and 120B include a state (i.e., preparation state, execution state, and termination state) for each guest memory page of source system 102 and target system 104, respectively. Firmware 108A and 108B also include table of guest integrity values 122A and 112B, respectively. Each stored guest memory page of source system 102 and target system 104 includes an associated integrity value, where the associated integrity values are stored in table of guest integrity values 122A and 122B.

Trusted firmware 108A and 108B also includes private system key 116A and 116B, secret guest key 118A and 118B, respectively, and global integrity value 124. Global integrity value 124 is a cumulative value signed by source system 102 to protect table of guest integrity values 122A for all the guest memory pages of source system 102. Global integrity values 124 and guest integrity values 122A and 122B are at least one of a message authentication code (MAC), a cryptographic signature, or a cryptographic signature of a hash value. Private system key 116A and 116B represent a key for encrypting and decrypting the global integrity values 124 and table of guest integrity values 122A and 122B. Secret guest key 118A and 118B is associated with table of guest integrity values 122A and 122B in the form of a signature identifying the system from which the table of guest integrity values 122A and 122B are sourced (i.e., source system 102 and target system 104).

Trusted firmware 108 (i.e., trusted firmware 108A and 108B) has the ability to initialize a virtual machine (i.e., guest 112A and 112B) and migrate a virtual machine between systems. In this embodiment, trusted firmware 108A is migrating a virtual machine from source system 102 to target system 104.

Hypervisor 110A and 110B each provide execution environments for virtual machines, such as guest 112A and 112B, to run on source system 102 and target system 104, respectively. In addition to guest 112A and 112B, hypervisor 110A and 110B may host one or more additional hypervisors not illustrated in FIG. 1. Therefore, guest 112A, guest 112B, hypervisor 110A, and hypervisor 110B may execute within one or more underlying levels of hypervisors. Hypervisor 110A and 110B include guest memory 114A and 114B, respectively. Guest memory 114A and 114B store the guest memory pages for guest 112A and guest 112B of hypervisor 110A and hypervisor 110B, respectively. In this embodiment, "e" represents an evicted guest memory page, "p" represents a populated guest memory page in executing guest 112B, "I" represents a populated guest memory page in a non-executing guest, and "0" represents an unpopulated guest memory page.

In general, network 106 may be any combination of connections and protocols that may support communications between source system 102 and target system 104. Network 106 may include, for example, a local area network (LAN), a wide area network (WAN), such as the internet, a cellular network, or any combination of the preceding, and may further include wired, wireless, and/or fiber optic connections.

Figure 2:
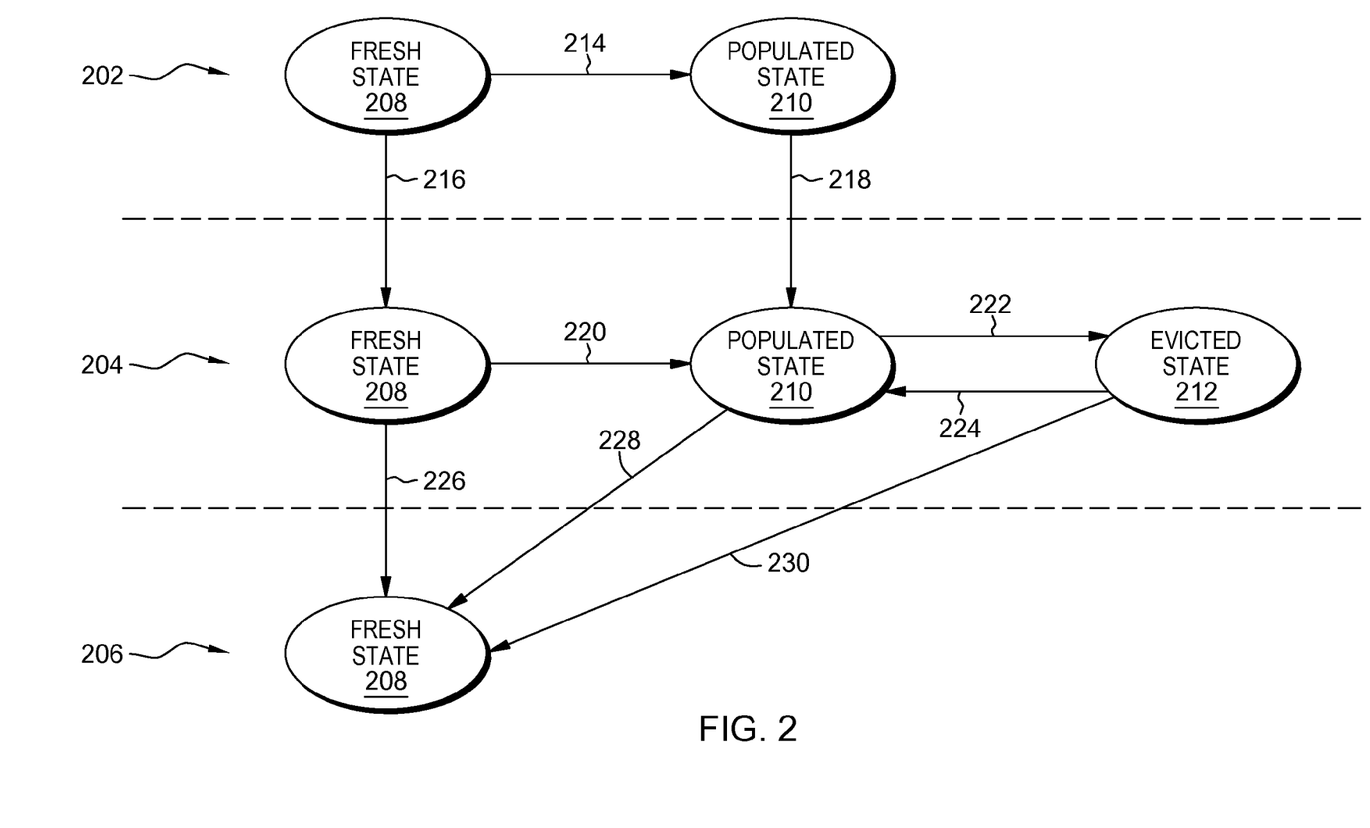
FIG. 2 illustrates one embodiment of a life cycle of a virtual machine for preserving integrity for virtual machine memory, in accordance with the present invention.

FIG. 2 illustrates one embodiment of a life cycle of a virtual machine for preserving integrity for virtual machine memory, in accordance with the present invention.

In order to establish a new virtual machine, a hypervisor defines a virtual address range associated with the new virtual machine. As a result, a virtual machine is created in preparation state 202 with guest memory pages associated with the virtual machine set to fresh state 208. In this embodiment, the guest memory pages in fresh state 208 are not associated with physical memory. A single guest memory page in fresh state 208 represents a guest memory page which has yet to be populated (i.e., memory page zero). A single guest memory page in populated state 210 is associated with a page frame. A single guest memory page in evicted state 212 includes an integrity value but no association with a page frame. The virtual machine in preparation state 202 represents an initial population of the guest memory pages. The virtual machine in execution state 204 ensures integrity of guest memory pages, where the virtual machine can run and modify the guest memory pages but a hypervisor cannot modify, refresh, or populate the guest memory pages. The virtual machine in termination state 206 represents the virtual machine no longer performing tasks and a deletion of content stored in the physical memory.

Transition 214 represents a hypervisor populating a portion of the guest memory pages in the address range of the virtual machine by submitting data into the portion of guest memory pages, thus placing the portion of guest memory pages into populated state 210. The hypervisor provides an integrity value for each guest memory page, which is matched against the system prior to the system accepting the guest memory page. During preparation state 202, the hypervisor can overwrite guest memory pages in populated state 210. The hypervisor can transfer a guest key, where the guest key is utilized to verify integrity values to the system. Upon verification of integrity values, the hypervisor initializes the virtual machine and can provide additional state information and a signed integrity value over all integrity values of all populated guest memory pages.

The guest state transition from preparation state 202 to execution state 204 occurs with the performing of an integrity check over all guest memory pages in populated state 210 and matching the signed integrity values for both transition 216 and 218. Transition 220 represents the virtual machine writing data to guest memory pages in fresh state 208, therefore populating the guest memory pages to populated state 210. During execution state 204, the virtual machine has the ability to overwrite populated guest memory pages in populated state 210.

During execution state 204, the hypervisor cannot write to guest memory pages in fresh state 208 and populated state 210. However, during execution state 204 the hypervisor can evict guest memory pages from populated state 210 to evicted state 212 through transition 222. Transition 222 represents the system obtaining a guest memory page from the virtual machine, computing an integrity value for the guest memory page, and allowing for the guest memory page to become available for the hypervisor. Additionally, the system can re-import guest memory pages in evicted state 212 through transition 224. For re-importation of evicted guest memory pages, the system computes the integrity value of the guest memory pages in evicted state 212 and matches the integrity value stored with the virtual machine address to the guest memory page being re-imported.

During termination state 206, the virtual machine is terminated and the system computes a signed integrity value over all integrity values of all guest memory pages in populated state 210 and evicted state 212 during execution state 204. The system allows for all the guest memory pages to become available for the hypervisor to utilize, as shown by transition 226 and 228. Any unpopulated guest memory pages in fresh state 208 during execution state 204 become available to the hypervisor and do not require the signed integrity value since the unpopulated guest memory pages have no integrity values, as shown by transition 228.

Figure 3:
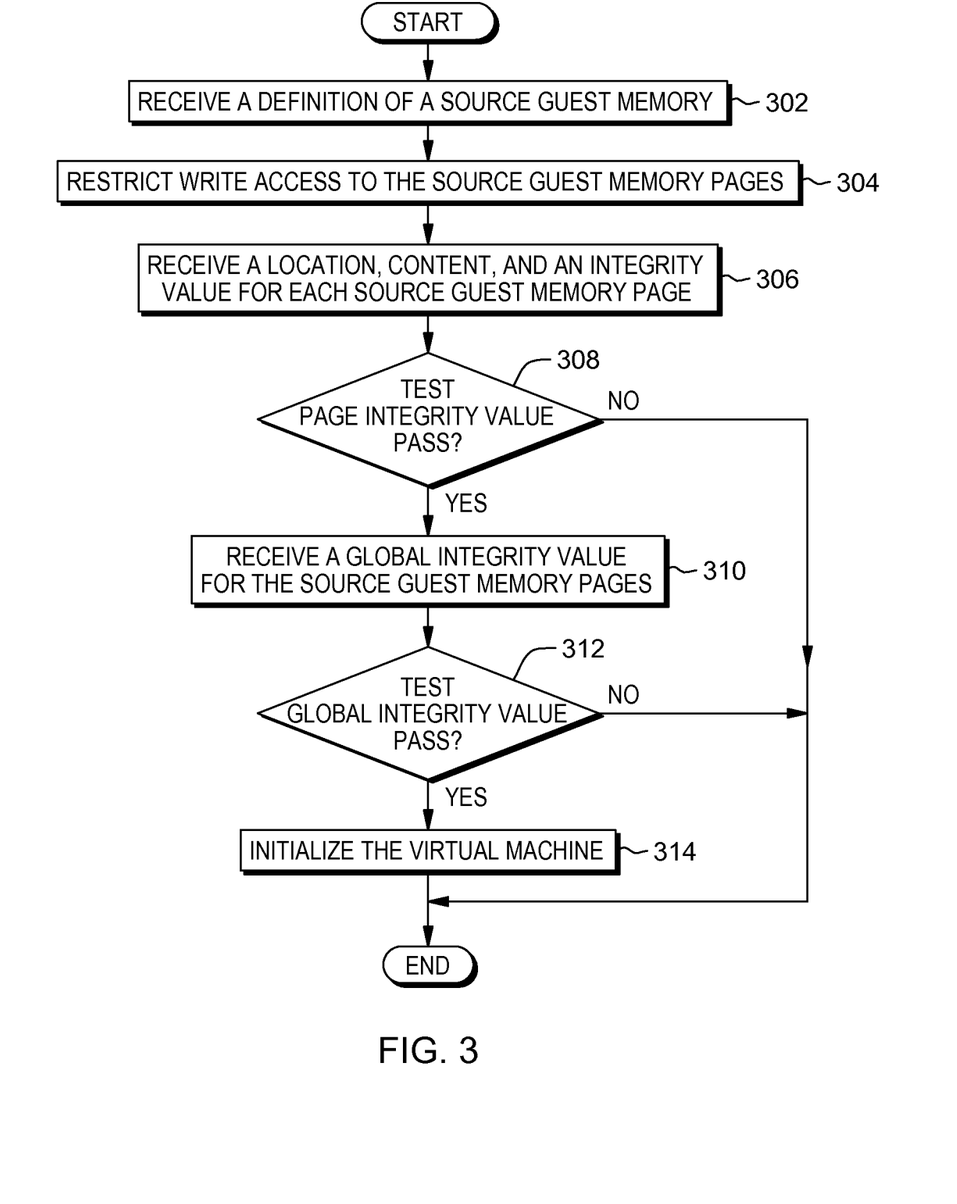
FIG. 3 is a flowchart depicting one embodiment of initializing a virtual machine on a source system, in accordance with the present invention.

FIG. 3 is a flowchart depicting one embodiment of initializing a virtual machine on a source system, in accordance with the present invention. As depicted, initialization of the virtual machine on the source system includes receiving (302) a definition of a source guest memory, restricting (304) write access to the source guest memory pages, receiving (306) a location, content, and an integrity value for each source guest memory page, determining (308) whether the integrity value passes the test, receiving (310) a global integrity value for the source guest memory pages, determining (312) whether the global integrity value passes the test, and initializing (314) the virtual machine. In one embodiment, initialization of the virtual machine is conducted by trusted firmware 108A.

The method may commence by receiving (302) a definition of a source guest memory. In this embodiment, a source hypervisor on a source system sends a definition of the source guest memory area to a trusted firmware on a source system. The trusted firmware receives the definition of the source guest memory area for storing guest memory pages of a virtual machine.

The method may continue by restricting (304) write access to the source guest memory pages. In this embodiment, the trusted firmware restricts writes to the source guest memory pages to ensure the global integrity values and the integrity values remain consistent prior to the initialization of the virtual machine on the source system.

The method may continue by receiving (306) a location, content, and an integrity value for each source guest memory page. In this embodiment, the source hypervisor submits a location, content, and an integrity value for each source memory page of the virtual machine. The trusted firmware continuously receives the location, content, and the integrity for each of the guest memory pages prior to the virtual machine initializing on the source system.

The method may continue by determining (308) whether the integrity value passes the test. In the event the integrity value passes the test ("yes" branch, 308), the method may continue by receiving (310) a global integrity value for the source guest memory pages. In the event the integrity value does not pass the test ("no" branch, 308), initialization of the virtual machine on a source system fails.

The method may continue by receiving (310) a global integrity value for the source guest memory pages. In this embodiment, the source hypervisor submits the global integrity value for each integrity value of the source memory page location that the trusted firmware receives. The trusted firmware receives the global integrity value for the most recent location associated with the integrity value of the guest memory page.

The method may continue by determining (312) whether the global integrity value passes the test. In the event the global integrity value passes the test ("yes" branch, 312), the method may continue by initializing (314) the virtual machine. In the event the global integrity value does not pass the test ("no" branch, 312), initialization of the virtual machine on a source system fails.

The method may continue by initializing (314) the virtual machine. Initializing the virtual machine includes the trusted firmware accessing a private system key, the trusted firmware managing the configuration of the virtual machine on the source system, and a secret guest key accessible by the trusted firmware allowing for the verification of integrity values for the virtual machine on the source system.

Figure 4:
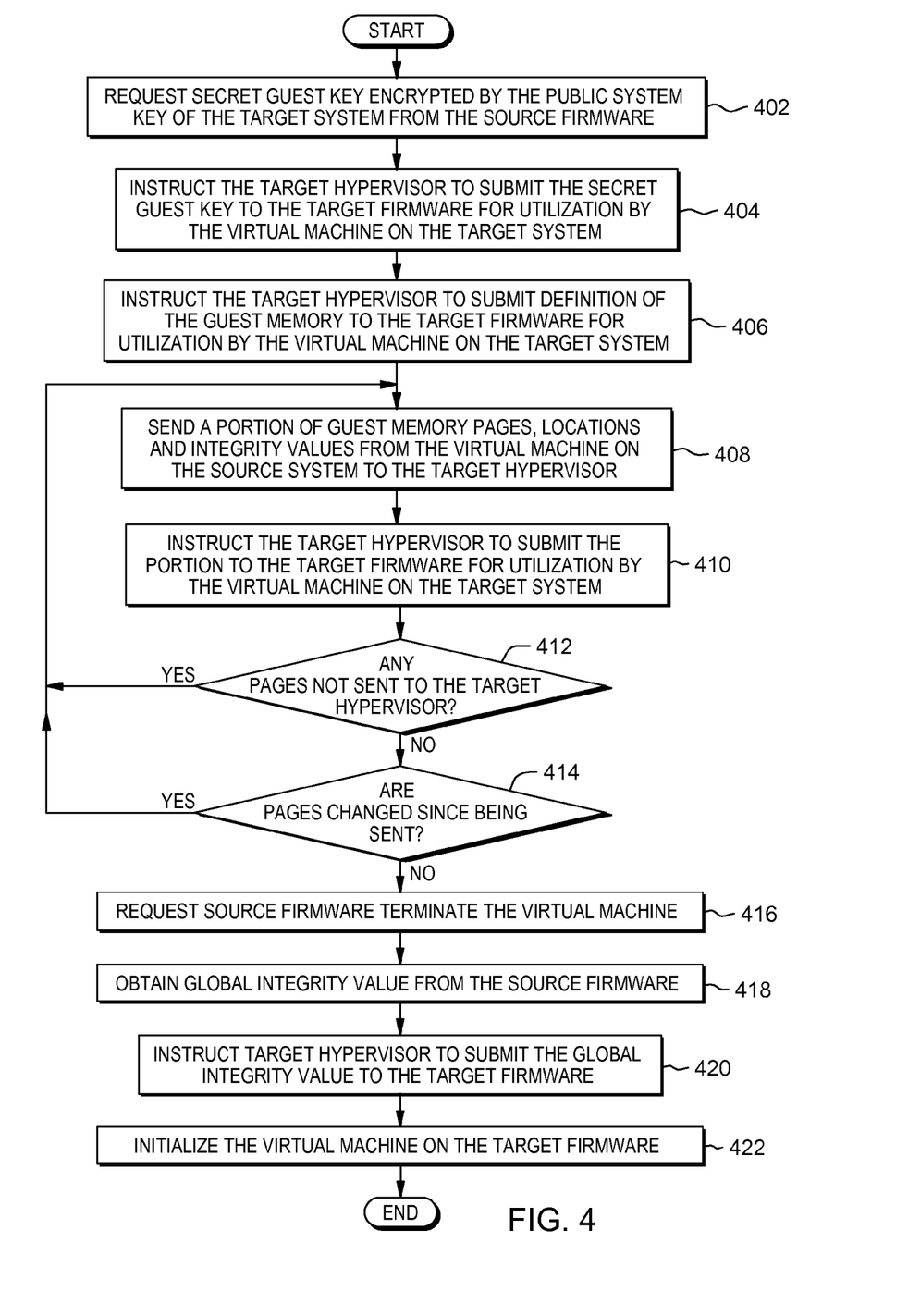
FIG. 4 is a flowchart depicting one embodiment of migrating a virtual machine from a source system to a target system, in accordance with the present invention.

FIG. 4 is a flowchart depicting one embodiment of migrating a virtual machine from a source system to a target system, in accordance with the present invention. As depicted, migrating the virtual machine includes requesting (402) a secret guest key encrypted by the public system of the target system from the source firmware, instructing (404) the target hypervisor to submit the secret guest key to the target firmware, instructing (406) the target hypervisor to submit definition of the guest memory to the target firmware, sending (408) a portion of guest memory pages, locations, and integrity values from the virtual machine on the source system to the target hypervisor, instructing (410) the target hypervisor to submit the portion to the target firmware, determining (412) if any pages not sent to the target hypervisors, determining (414) if any pages changed since being sent, requesting (416) source firmware terminate the virtual machine, obtaining (418) global integrity value from the source firmware, instructing (420) target hypervisor to submit the global integrity value to the target firmware, and initializing (422) the virtual machine on the target firmware. In one embodiment, the method is conducted by hypervisor 110A on source system 102.

In this embodiment, a virtual machine in an execution state running on a source hypervisor of a source system is being migrated to a target hypervisor. The source hypervisor sends the secret guest key from the source system to the target hypervisor of the target system. The target hypervisor creates a virtual machine at the target system during the preparation state. The source hypervisor evicts guest memory pages from the virtual machine and transfers the guest memory pages and associated integrity values to the target hypervisor. The target hypervisor utilizes the guest memory pages and integrity values received from the source hypervisor to populate the virtual machine in the preparation state at the target system. In the event a page changes during the migration process, the source hypervisor can re-import evicted guest memory pages and continue operating the virtual machine on the source system. Evicted guest memory pages and associated integrity values are sent to the target hypervisor and the target hypervisor populates guest memory of the target system during the preparation state of the virtual machine at the target system. The target hypervisor loads the guest states of the guest memory pages and the integrity value to initialize the virtual machine on the target system.

The method may commence by requesting (402) a secret guest key encrypted by the public system key of the target system from the source firmware. Source firmware represents trusted firmware on the source system and target firmware represents trusted firmware on the target system. The method may continue by instructing (404) the target hypervisor to submit the secret guest key to the target firmware for utilization by the virtual machine on the target system. The method may continue by instructing (406) the target hypervisor to submit definition of guest memory area to the target firmware for utilization by the virtual machine on the target system. In this embodiment, the source firmware on the source system instructs the target hypervisor on the target system to submit a definition of a target guest memory area for utilization by the virtual machine to the target firmware at the target system.

The method may continue by sending (406) a portion of guest memory pages, locations, and integrity values from the virtual machine on the source system to the target hypervisor. Source firmware sends the portion of guest memory pages, locations, and integrity values by evicting guest memory pages from the virtual machine and requesting associated integrity values for the evicted guest memory pages. Evicting guest memory pages includes computing and storing an integrity value for each guest memory page, removing access rights to each guest memory page from the virtual machine, and granting write access to the evicted guest memory page to the source hypervisor. The target hypervisor has no write access to the trusted firmware of the target system for inclusion in the target guest memory while the target virtual machine is in preparation state.

Source firmware sends both locations and content of the evicted guest memory pages to the target hypervisor on the target system. As a result, the target hypervisor can provide the target guest memory area for the evicted guest memory pages from the source system. Importing an evicted guest memory page at the source guest page location by the source hypervisor includes the trusted firmware of the source system matching the integrity value for the source guest page location to the content of the imported guest page, restricting write access to the virtual machine, and storing the access rights of the virtual machine to the imported guest memory page. The method may continue by instructing (410) the target hypervisor to submit the portion to the target firmware for utilization by the virtual machine on the target system.

The method may continue by determining (412) if any guest memory pages were not sent to the target hypervisor. In the event there all the guest memory pages were sent to the target hypervisor ("no" branch, 412), the method may continue by determining (414) if any guest memory pages have changed since being sent. In the event there are guest memory pages which were not sent to the target hypervisor ("yes" branch, 412), the method may continue by sending (408) the portion of guest memory pages, locations, and integrity values from the virtual machine on the source system to the target hypervisor.

The method may continue by determining (414) if any guest memory pages have changed since being sent. In the event the guest memory pages have not changed since being sent ("no" branch, 414), the method may continue by requesting (416) source firmware terminate the virtual machine. In the event there is at least one guest memory page that has changed since being sent ("yes" branch, 414), the method may continue by sending (408) the portion of guest memory pages, locations, and integrity values from the virtual machine on the source system to the target hypervisor.

The method may continue by requesting (416) source firmware terminate the virtual machine and obtaining (418) the global integrity value from the source firmware. The method may continue by instructing (420) the target hypervisor to submit the global integrity value to the target firmware and initializing (422) the virtual machine on the target firmware.

The trusted firmware for migrating a virtual machine from a source system to a target system can include the commands shown in Table 1.

According to a first aspect of the invention a method for incrementally setting up a guest on a source hypervisor running on a source system includes, the source hypervisor submitting a definition of a source guest memory area to be used by the guest to a trusted firmware, the trusted firmware being part of the source system; the trusted firmware restricting write access to the source memory area of the guest by the source hypervisor; the source hypervisor repeatedly submitting a source guest page location, the contents of a guest memory page and an integrity value of the source guest page location and the contents of the guest memory page to the trusted firmware; the trusted firmware accepting submitted guest memory pages for which the contents and the designated locations can be verified against the submitted integrity values; the source hypervisor submitting a global integrity value for a multitude of the integrity values associated with the source guest page locations submitted to the trusted firmware, such that for each source guest page location only the latest integrity value submitted to the trusted firmware is used; and after successful verification of the global integrity value the trusted firmware starting the guest on the source hypervisor.

The tasks of the hypervisor are to incrementally set up the guest memory and start the guest image. Further the hypervisor has to page out/page in guest pages as well as incrementally migrate the guest to another hypervisor.

This invention protects the integrity of a guest memory supporting the operations by importing the initial guest image to be started or booted; allowing the hypervisor to swap guest memory pages in and out of the system; allowing the hypervisor to migrate a guest to a target hypervisor selected by the guest owner; and allowing the hypervisor to

TABLE 1

Example Commands for Migrating a Virtual Machine prepare_initial_page_import(address a, mac m)
  if guest is in prep-mode
    then turn PTE(a) into an evicted page frame by associating PTE(a) with MAC m
    else fail
import_page(address a, page p)
  if PTE(a) is evicted and m is the MAC associated with PTE(a) and m == MAC(a,p)
    then populate PTE(a) with page p; storage-key-protect p; [ possibly decrypt p ]
    else fail
export_page(address a, page p, mac m)
  if PTE(a) is populated
    then [possibly encrypt p]; storage-key-unprotect p; set m to MAC(a, p), evict PTE(a)
    else fail
start_guest(mac m)
  Let M be the concatenation of all MACs of all non-fresh PTEs
  if m = MAC(M) turn
    then the guest into started state
    else fail
stop_guest(mac m)
  Let M be the concatenation of all MACs of all non-fresh PTEs
  Set m to MAC(M); stop guest.
define_target(pubkey K, mac m)
  if m = MAC(K)
    then k can be used as public key of an approved target system. The trusted firmware stores k and m.
    else fail
get_target_info(pubkey K, wrappedkey ek, wrappedkey mk)
  if K is an approved key known to the trusted firmware
    then ek and mk are the guest encryption and mac keys each wrapped by K
  else failMAC(M) is a key-ed hash of a guest MAC-key k and a message M (e.g. HMAC(k,M) ).
MAC(a,p) is a key-ed hash of a guest MAC-key k, an address a and a page p (e.g. HMAC(k,a||p) ).
PTE(a) is the hypervisor memory address of the page frame containing the guest virtual address a.

suspend a guest (e.g. to disk) and resume the guest on a target hypervisor selected by the guest owner while protecting against changes of the guest memory pages including replay attacks.

The integrity goals presumed by the inventive method are that the hypervisor is not able to corrupt guest memory pages. Further the hypervisor should not be allowed to reuse old guest memory pages at a later time, which is called a replay attack. And the hypervisor should not be allowed to reuse a guest memory page at another page location, which is called a relocation attack.

Trusted hardware and trusted firmware each have a private key unique to the trusted hardware/firmware which cannot be extracted from the hardware/firmware. The hardware/firmware allows pages of guest memory to be declared secure. Once the guest memory is declared secure it can no longer be directly written to by the hypervisor. The guest can securely transport a key to the trusted firmware (e.g. using a key exchange protocol using the private key of the trusted hardware and trusted firmware) as well as that the trusted firmware can protect the guest memory pages from write access by the hypervisor.

According to an embodiment of the invention, for setting up the guest, the method may include the source system having a private key only accessible by the trusted firmware; the trusted firmware controlling the configuration and set up of the guest on the source system; and the trusted firmware having a secret key associated with the guest that allows to verify integrity values for the guest.

For one guest definition, the trusted firmware receives a guest secret key wrapped by a public key associated with the private key of the hardware/firmware. The trusted firmware may store in a memory, which is not accessible to the hypervisor, an integrity value per guest memory page. This integrity value may ensure both the integrity of the page contents and the integrity of the page location. Before the guest may start all non-zero memory pages of the guest are prepared for import, resulting in providing an integrity value of each memory page to the trusted firmware, as well as, providing an integrity value over the concatenation of all those page integrity values in a defined order.

Once the preparation is complete only memory pages that match the page integrity value stored by the trusted firmware may be imported. The hypervisor may explicitly request pages to be evicted. In that case the trusted firmware keeps the hash or an integrity value of the evicted memory page. The hypervisor can request to terminate a guest and obtain an integrity value with all integrity values of all memory pages signed with the secrete key of the guest.

In an embodiment, for evicting the guest memory page by the trusted firmware steps may include, removing access rights to the guest memory page from the guest; computing and storing an integrity value of the guest memory page; and granting write access to the evicted guest memory page to the source hypervisor. This serves to ensure that the source hypervisor is able to perform page out tasks as well as migration of guest memory pages to another hypervisor. The guest is disabled to modify the guest memory page anymore so, that the memory page remains unchanged.

For importing the evicted guest memory page at the source guest page location by the source hypervisor the following steps may be performed: the trusted firmware restricting write access to the guest memory page by the source hypervisor; the trusted firmware checking whether the integrity value stored for that source guest page location matches the contents of the imported guest memory page; if the match fails the trusted firmware aborting the action; and the trusted firmware restoring the access rights of the guest to the imported guest memory page. So, because the source hypervisor may need additional memory space, the source hypervisor is thus enabled to page out guest memory pages. If the guest needs a memory page, the hypervisor may therefore import the guest memory page again.

In an embodiment the source hypervisor obtains the integrity value of the evicted guest memory page. This is intended for the source hypervisor to migrate a guest memory page without exporting the guest memory page.

According to an embodiment, terminating execution of the guest on the source hypervisor may include the trusted firmware computing a global integrity value of the multitude of integrity values of all guest memory pages including the integrity values of those guest memory pages that have been submitted, evicted or have a non-zero contents; as well as allowing the source hypervisor to obtain the global integrity value. This global integrity value may be transferred to the target trusted firmware for migration of a guest to a target system.

According to another embodiment of the invention, the guest being executed on the source hypervisor may be migrated to the target hypervisor by transferring the secret key to verify integrity values encrypted by the public key of the trusted firmware of the target system; the target hypervisor submitting a definition of a target guest memory area to be used by the guest to the trusted firmware of the target system. Hereby the source hypervisor may repeatedly be performing one of the following operations; evicting guest memory pages from the guest and requesting associated integrity values for these guest memory pages and sending both the guest memory page contents of the evicted guest memory pages together with their source guest page locations and associated integrity values to the target hypervisor. Further steps may include, reimporting some of the evicted guest memory pages, if requested by the guest running on the source hypervisor; the target hypervisor repeatedly submitting guest memory pages and their source guest page locations and associated integrity values to the trusted firmware of the target system; the trusted firmware on the source system terminating execution of the guest on the source hypervisor; and the source hypervisor transferring the global integrity value of the terminated guest to the target hypervisor; the target hypervisor submitting the global integrity value to the trusted firmware of the target system and so finishing the setting up of the guest on the target system. The described process follows the standard migration step to set up an empty guest container on the target hypervisor; copy guest memory pages from the source guest to the target guest container while source guest continues to run. The source system will keep transferring guest memory pages until the remaining set of guest memory pages is small enough. Then the guest will be terminated on the source hypervisor. The source system will transfer the remaining guest pages and the guest state to the target guest container on the target hypervisor. Then finally the guest will be started on the target hypervisor.

The trusted firmware of the target system has access to a private system key of the system and the guest running on the source hypervisor may be securely submitting to the trusted firmware a public key corresponding to the private system key of the system running a target hypervisor. This public key may be used for transferring the secret guest key used to sign integrity values to the target system. The guest is thus able to control to whom the guest can trust. The secret guest key is wrapped at the beginning of the process with the public key of the target system the target hypervisor is running on and stored to the source trusted firmware. Then the wrapped secret key is transferred to the target trusted firmware.

For suspending a guest the source hypervisor may be using the integrity value of the guest wrapped by the public key of the source system where the guest is to be resumed, for terminating the guest. The global integrity value may be signed using the guest key and returned when terminating the guest on the source hypervisor.

All guest memory pages whose content was not submitted by the source hypervisor to the trusted firmware may be treated as zero pages after the trusted firmware starts the guest. This is for reducing the probability for introducing additional insecurities due to remaining information in guest memory pages which are no longer in use.

According to an embodiment the integrity value may be at least one of a message authentication code (MAC) or a cryptographic signature, or a cryptographic signature of a hash value each using a secret key to sign the hash or signature respectively.

According to another embodiment the trusted firmware may provide a function to a guest that allows the guest to check whether the trusted firmware is in possession of a secret key associated with the guest. This function serves for checking if the method may be used for transferring a guest to a target system.

Figure 5:
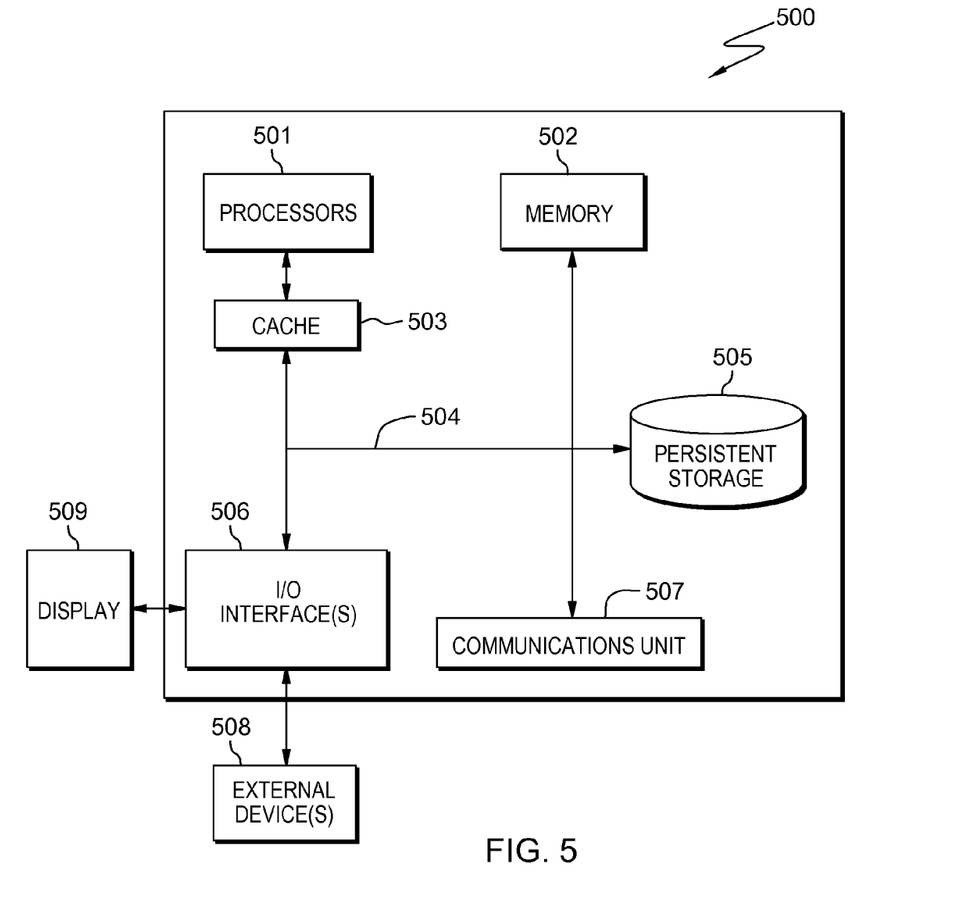
FIG. 5 is a block diagram of components of a computer system, such as the computer server of FIG. 1, in accordance with an embodiment of the present invention.

FIG. 5 depicts computer system 500, where source system 102 is an example of computer system 500 that includes trusted firmware 108A. The computer system includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by one or more processors, a definition of a source guest memory area for utilization by a virtual machine on a source system, wherein the source system includes a source trusted firmware and a source hypervisor;
   restricting, by one or more processors, write access to the source guest memory area of the virtual machine;
   receiving, by one or more processors, repeatedly from the source hypervisor, a source guest memory page location, content for each of a plurality of source guest memory pages, and an integrity value for each of a plurality of source guest memory page locations;
   receiving, by one or more processors, a global integrity value for integrity values associated with the plurality of source guest memory page locations, wherein a latest integrity value for each of the plurality of source guest memory page locations is utilized; and
   subsequent to verifying the global integrity value received from the source hypervisor matches the integrity values, initializing, by one or more processors, the virtual machine on the source hypervisor.

2. The method of claim 1, further comprising:
   managing, by one or more processors, a configuration of the virtual machine on the source system, wherein the source system includes a private key accessible by the source trusted firmware; and
   verifying, by one or more processors, the integrity values for the virtual machine, received with the definition of the source guest memory area, according to a secret guest key associated with the virtual machine accessible only by the source trusted firmware.

3. The method of claim 2, wherein another plurality of source guest memory pages not received by the source trusted firmware are non-content filled pages.

4. The method of claim 2, wherein the integrity value for each of the plurality of source guest memory page locations is at least one of a message authentication code or a cryptographic signature.

5. The method of claim 2, wherein the source trusted firmware allows the virtual machine to determine whether the source trusted firmware is in possession of a secret key associated with the virtual machine.

6. The method of claim 2, further comprising:
removing, by one or more processors, access rights to a first source guest memory page from the virtual machine;
computing, by one or more processors, a first integrity value for the first source guest memory page; and
subsequent to storing the first integrity value in memory accessible to the source trusted firmware, granting, by one or more processors, write access to the first source guest memory page to the source hypervisor, wherein the first source guest memory page is an evicted guest memory page.

7. The method of claim 6, further comprising:
restricting, by one or more processors, write access to the evicted guest memory page;
verifying, by one or more processors, the first integrity value stored for a location of the evicted guest memory page matches content of the evicted guest memory page; and
subsequent to determining the verification fails, restoring, by one or more processors, write access to the evicted guest memory page.

8. The method of claim 6, further comprising:
restricting, by one or more processors, write access to the evicted guest memory page;
verifying, by one or more processors, the first integrity value stored for the location of the evicted guest memory page matches content of the evicted guest memory page; and
subsequent to determining that the verification succeeds, granting, by one or more processors, write access to the evicted page by the virtual machine.

9. The method of claim 6, wherein the source hypervisor is obtaining the first integrity value of the evicted guest memory page.

10. The method of claim 6, further comprising:
computing, by one or more processors, the global integrity value of the integrity values for the plurality of source guest memory pages, wherein the plurality of source guest memory pages include submitted, evicted, or content filled pages;
terminating, by one or more processors, the virtual machine; and
granting, by one or more processors, the source hypervisor access to the global integrity value.

11. The method of claim 10, further comprising:
sending, by one or more processors, the secret guest key to verify the integrity values encrypted by a public key of a target trusted firmware of a target system;
continuously evicting, by one or more processors, the plurality of source guest memory pages from the virtual machine;
requesting, by one or more processors, integrity values for a plurality of evicted guest memory pages;
continuously sending, by one or more processors, content of the plurality of evicted guest memory pages, locations of the plurality of evicted guest memory pages, and integrity values for the plurality of evicted guest memory pages to a target hypervisor on the target system;
subsequent to the target hypervisor continuously submitting the plurality of evicted guest memory pages, locations, and integrity values to the target trusted firmware of the target system, terminating, by one or more processors, the virtual machine on the source hypervisor; and
sending, by one or more processors, the global integrity value of the terminated virtual machine to the target hypervisor, wherein the target hypervisor submits the global integrity value to the target trusted firmware of the target system.

12. The method of claim 11, further comprising:
subsequent to sending content, locations, and integrity values of the plurality of evicted guest memory pages, sending, by one or more processors, a new location, new content, and associated integrity value for at least one of the source guest memory pages to the target hypervisor; and
sending, by one or more processors, the global integrity value for integrity values associated with the plurality of source guest memory page locations to the target hypervisor that submits the global integrity value to the target trusted firmware of the target system, wherein a latest integrity value for each of the plurality of source guest memory page locations of the terminated virtual machine is utilized.

13. The method of claim 12, further comprising:
receiving, by one or more processors, from the virtual machine on the source hypervisor, the public key corresponding to a private system key of the target system running a target hypervisor, wherein the public key is signed by the virtual machine.

14. The method of claim 12, wherein terminating the virtual machine on the source hypervisor comprises suspending, by one or more processors, the virtual machine utilizing the integrity value of a virtual machine wrapped by the public key of the target system where the virtual machine is resumed.

* * * * *